(12) United States Patent
Qian et al.

(10) Patent No.: US 12,456,267 B2
(45) Date of Patent: Oct. 28, 2025

(54) AUTOMATIC REGISTRATION OF LANDMARKS FOR AUGMENTED REALITY ASSISTED SURGERY

(71) Applicant: Medivis, Inc., New York, NY (US)

(72) Inventors: Long Qian, Watchung, NJ (US); Christopher Morley, New York, NY (US); Osamah Choudhry, New York, NY (US); Florentin Jonas Liebmann, New York, NY (US)

(73) Assignee: Medivis, Inc., New York, NY (US)

(*) Notice: Subject to any disclaimer, the term of this patent is extended or adjusted under 35 U.S.C. 154(b) by 207 days.

(21) Appl. No.: 18/244,138

(22) Filed: Sep. 8, 2023

(65) Prior Publication Data
US 2024/0412465 A1 Dec. 12, 2024

Related U.S. Application Data

(63) Continuation-in-part of application No. 18/243,402, filed on Sep. 7, 2023, and a continuation-in-part of application No. 18/208,136, filed on Jun. 9, 2023.

(51) Int. Cl.
*G06T 19/00* (2011.01)
*G06T 7/73* (2017.01)

(52) U.S. Cl.
CPC .............. *G06T 19/006* (2013.01); *G06T 7/73* (2017.01); *G06T 2207/10028* (2013.01); *G06T 2207/10048* (2013.01)

(58) Field of Classification Search
None
See application file for complete search history.

(56) References Cited

U.S. PATENT DOCUMENTS

2021/0201476 A1* 7/2021 Prasad .................... G06T 7/521

OTHER PUBLICATIONS

Soler et al., "Augmented Reality in Laparoscopic Surgical Oncology" Elsevier, 2011. (Year: 2011).*

* cited by examiner

*Primary Examiner* — Nicholas R Wilson
(74) *Attorney, Agent, or Firm* — Cognition IP, P.C.; Edward Steakley; Rajesh Fotedar

(57) ABSTRACT

Various embodiments of an apparatus, methods, systems and computer program products described herein are directed to a Registration Engine that identifies a region of interest from an infrared image portraying a target portion of a physical anatomy in a current physical pose. The Registration Engine generates a 3D point cloud of the region of interest. The Registration Engine identifies region of interest isosurface data by detecting matches between isosurface data and the 3D point cloud. The Registration Engine determines display location, at the target portion of the physical anatomy, for the region of interest isosurface data. The Registration Engine renders an Augmented Reality (AR) display of medical data with respect to the display location.

14 Claims, 9 Drawing Sheets

AUTOMATIC REGISTRATION OF LANDMARKS FOR AUGMENTED REALITY ASSISTED SURGERY

CROSS REFERENCE TO RELATED APPLICATIONS

This application is a continuation-in-part of U.S. patent application Ser. No. 18/243,402 entitled "ALIGNMENT OF VIRTUAL OVERLAY BASED ON TRACE GESTURES" filed on Sep. 7, 2023, the entirety of which is incorporated by reference.

This application is a continuation-in-part of U.S. patent application Ser. No. 18/208,136 entitled "SURGICAL NAVIGATION TRAJECTORY IN AUGMENTED REALITY DISPLAY," filed on Jun. 9, 2023, the entirety of which is incorporated by reference.

BACKGROUND

Current conventional systems have limitations with regard to two-dimensional (2D) and three-dimensional (3D) images in surgical settings. Surgical planning and surgical navigation are necessary for every medical procedure. A surgeon and their team must have a plan for a case before entering an operating room, not just as a matter of good practice but to minimize malpractice liabilities and to enhance patient outcomes. Surgical planning is often conducted based on medical images including DICOM scans (MRI, CT, etc.), requiring the surgeon to flip through numerous views/slices, and utilizing this information to imagine a 3D model of the patient so that the procedure may be planned. Accordingly, in such a scenario, the best course of action is often a surgeon's judgment call based on the data that they are provided.

SUMMARY

Various embodiments of an apparatus, methods, systems and computer program products described herein are directed to a Registration Engine for identifying a region of interest in a target portion of physical anatomy without requiring explicit user selection of the region of interest's location on the target portion of physical anatomy. The Registration Engine automatically identifies a region of interest in a target portion of physical anatomy by feeding image data into a landmark detection algorithm specific to the target portion of physical anatomy.

According to various embodiments, the Registration Engine identifies a region of interest from an infrared image portraying a target portion of a physical anatomy in a current physical pose. The physical pose comprises a current position and orientation represented by coordinates in a unified three-dimensional (3D) coordinate space. The Registration Engine generates a 3D point cloud of the region of interest based in part on the infrared image. The Registration Engine identifies region of interest isosurface data by detecting matches between one or more portions of the isosurface data and the 3D point cloud. The Registration Engine determines a display location, at the target portion of the physical anatomy, for the region of interest isosurface data according to coordinates in the unified 3D coordinate space. The Registration Engine renders an Augmented Reality (AR) display of medical data with respect to the display location for the region of interest isosurface data.

According to one or more embodiments, the 3D point cloud represents the region of interest based on the physical pose of the target portion of the physical anatomy in accordance with the unified coordinate system.

In some embodiments, the Registration Engine extracts isosurface data from medical scan data of the target portion of the physical anatomy. The isosurface data corresponding to respective physical surface locations at the region of interest.

According to various embodiments, the Registration Engine determines a position and orientation of a current pose of a reference array, the current pose of the reference array comprising coordinates in the unified coordinate system. The Registration Engine determines a relative position of the reference array with respect to the physical location of the region of interest. The Registration Engine transposes the region of interest isosurface data according to the relative position of the reference array to identify the display location for the virtual overlay of medical data.

In one or more embodiments, the Registration Engine registers the region of interest isosurface data with the display location. For example, the display location is based on a physical location of the region of interest on a patient's body. By registering the region of interest isosurface data at the display location, the Registration Engine display medical data as the virtual overlay in alignment with the target portion of the physical anatomy.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
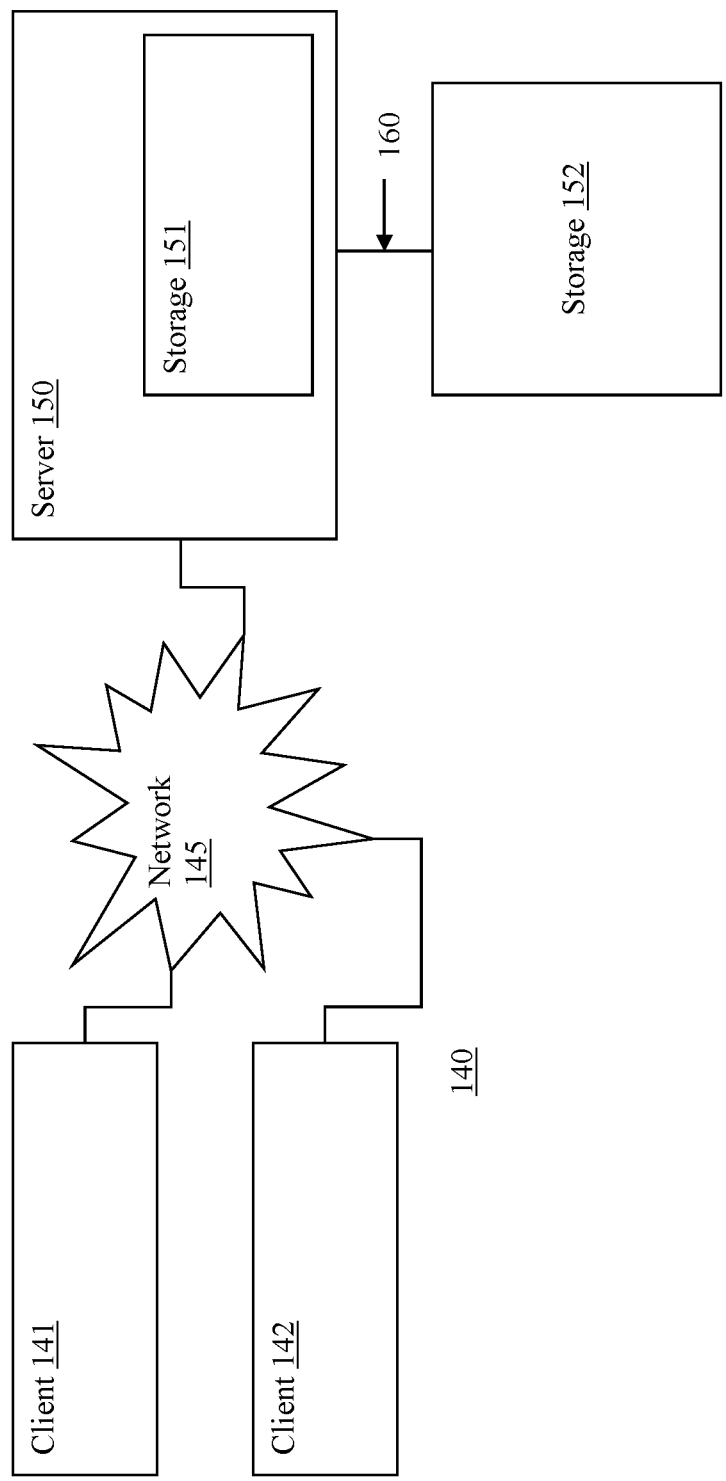
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
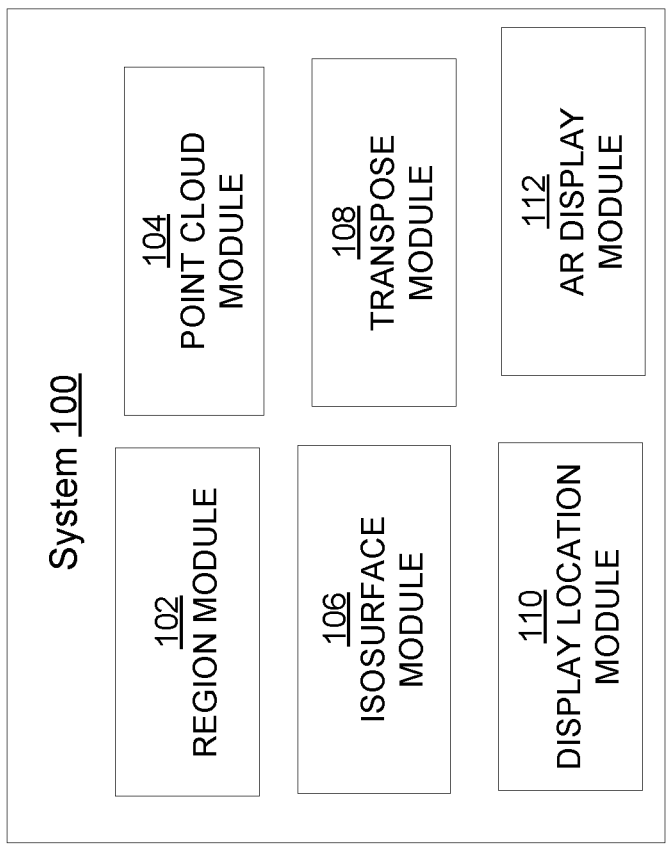
FIG. 1B is a diagram illustrating an exemplary environment in which some embodiments may operate.

FIG. 1B illustrates a block diagram of an example system 100 for a Registration Engine that includes one or more modules. The system 100 may communicate with a user device 140 to display output, via a user interface 144 generated by an application engine. In various embodiments, the user device 140 may be an AR display headset device that further includes one or more of the respective modules 102, 104, 106, 108, 110, 112.

A region module 102 of the system 100 may perform functionality, steps, operations, commands and/or instructions as illustrated in one or more of FIGS. 2, 3, 4, 5, 6A, 6B (hereinafter "FIGS. 2-6B"). The region module 102 may identify a region of interest based on one or more images of a target portion of physical anatomy.

The point cloud module 104 of the system 100 may perform functionality, steps, operations, commands and/or instructions as illustrated in one or more of FIGS. 2-6B. The point cloud module 104 may generate a 3D point cloud for an identified region of interest.

The isosurface module 106 of the system 100 may perform functionality, steps, operations, commands and/or instructions as illustrated in one or more of FIGS. 2-6B. The isosurface module 106 may extract isosurface data and determine a match between various portions of the extracted isosurface data and the 3D point cloud for the identified region of interest. In some embodiments, the isosurface module 106 may implement an ICP algorithm.

The transpose module 108 of the system 100 may perform functionality, steps, operations, commands and/or instructions as illustrated in one or more of FIGS. 2-6B. The region module 106 may determine respective regions of an AR rendering and the physical surface. The transpose module 108 may determine a location for the extracted isosurface data based on a relative position of a reference array.

The display location module 110 of the system 100 may perform functionality, steps, operations, commands and/or instructions as illustrated in one or more of FIGS. 2-6B. The display location module may determine a display location for a virtual overlay of medical data.

The AR display module 112 of the system 100 may perform functionality, steps, operations, commands and/or instructions as illustrated in one or more of FIGS. 2-6B. May generate an AR display and continuously update the AR display.

A database associated with the system 100 maintains information, such as 3D medical model data, in a manner the promotes retrieval and storage efficiency and/or data security. In addition, the model data may include rendering parameters, such as data based on selections and modifications to a 3D virtual representation of a medical model rendered for a previous Augmented Reality display. In various embodiments, one or more rendering parameters may be preloaded as a default value for a rendering parameter in a newly initiated session of the Registration Engine.

In various embodiments, the Registration Engine accesses one or more storage locations that contain respective portions of medical model data. The medical model data may be represented according to two-dimensional (2D) and three-dimensional (3D) medical model data. The 2D and/or 3D ("2D/3D") medical model data 124 may include a plurality of slice layers of medical data associated with external and internal anatomies. For example, the 2D/3D medical model data 124 may include a plurality of slice layers of medical data for generating renderings of external and internal anatomical regions of a user's head, brain and skull. It is understood that various embodiments may be directed to generating displays of any internal or external anatomical portions of the human body and/or animal bodies. In some embodiments, 2D/3D medical model data may be accessible and portrayed via a 3D cloud point representation of an anatomical region. The medical model data 124 may further be based on medical scan data.

Figure 2:
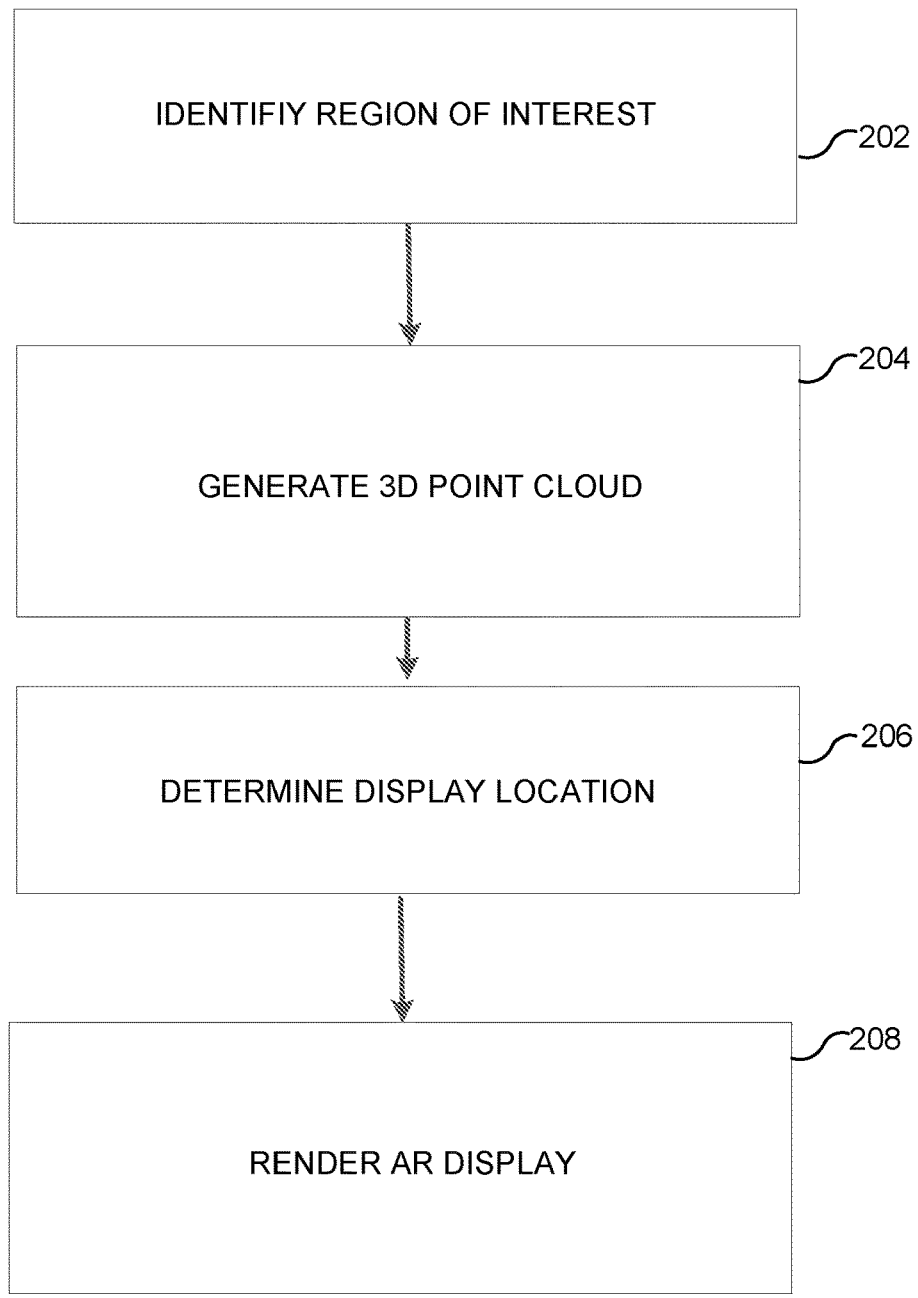
FIG. 2 is a diagram illustrating an exemplary method that may be performed in some embodiments.

As shown in the flowchart 200 of FIG. 2, at step 202, the Registration Engine identifies a region of interest from an infrared image. The Registration Engine captures one or more images of a target portion of physical anatomy. For example, the Registration Engine captures an infrared image and a depth image of the target portion of physical anatomy. The Registration Engine feeds the infrared image into a machine learning algorithm that corresponds with the target portion of physical anatomy. For example, the target portion of the physical anatomy may be a facial area and the machine learning algorithm may be a facial landmark detection algorithm.

It is understood that embodiments of the Registration Engine described herein are not limited to the facial area. That is, the target portion of physical anatomy may be any anatomical portion, for example, such as a hand, leg, torso, and/or shoulder. The corresponding machine learning algorithms thereby may be, respectively, a hand landmark detection algorithm, a leg landmark detection algorithm, a torso landmark detection algorithm and/or a shoulder landmark detection algorithm.

At step 204, the Registration Engine generates a 3D point cloud of the region of interest. According to various embodiments, the infrared image and the depth image may be collocated. For example, the infrared image and depth image may portray different types of imagery for the same respective locations on the target portion of the patient's physical anatomy. Due to such collocation, the Registration Engine utilizes the coordinates of the output region of interest to identify the portrayal of the region of interest in the capture depth image. The depth image includes pixels with depth information. By isolating the pixels in the region of interest from the depth image, the Registration Engine generates a 3D (three-dimensional) point cloud of the region of interest. The 3D point cloud represents the region of interest in accordance with a current pose of the target portion of physical anatomy.

At step 206, the Registration Engine determines display location, at the target portion of the physical anatomy, for the region of interest isosurface data. The Registration Engine extracts isosurface data from medical scan data and matches isosurface data for the region of interest to the 3D point cloud. As the surface locations indicated in the isosurface data belong to the region of interest, the Registration Engine identifies where to present the isosurface data in the AR display relative to the current pose of the patient—which is represented by the coordinates of the 3D point cloud.

In various embodiments, the Registration Engine detects a current pose (i.e. current position and orientation) of a reference array placed on the patient. For example, the reference array may include one or more fiducial markers. The reference array may be physically affixed to the patient proximate to the target portion of physical anatomy. The Registration Engine determines the coordinates that represent the current pose of the reference array. The coordinates of the 3D point cloud of the region of interest and the reference array are defined according to the unified coordinate system. The coordinates of the 3D point cloud of the region of interest indicate where on the patient's body the region of interest is physically situated.

The Registration Engine determines a relative position of the reference array. The physical position of the reference array on the patient's body relative may be proximate to the physical location of the region of interest. The 3D point cloud includes coordinate of the region of interest according to the current pose the patient's facial area. The Registration Engine utilizes the coordinates of the reference array and the 3D point cloud to determine the position of the reference array relative to the physical location of the region of interest at the patient's facial area. The Registration Engine may transpose the isosurface data according to the reference array's relative position, in order to determine a display location. The display location represents coordinates in the unified coordinate space for AR display of a virtual overlay of medical data in alignment with the physical region of interest.

At step 208, the Registration Engine renders an AR display of medical data with respect to the display location for the region of interest isosurface data. In some embodiments, the medical model data may be 3D medical model data. The Registration Engine renders 2D/3D medical model data in the AR display at the display location. In addition, the Registration Engine renders the 2D/3D medical model data based in part on the physical pose of the target portion of physical anatomy. The Registration Engine further renders the 2D/3D medical model data based in part on a current device pose of an AR headset device worn by the user, the physical pose of the target portion of physical anatomy and/or the pose of the reference array.

The current device pose represents a current position and orientation of the AR headset device in the physical world. The Registration Engine translates the current device pose to a position and orientation within the unified 3D coordinate system to determine the perspective view of the AR display provided to the user via the headset device. The Registration Engine generates a rendering of the 2D/3D medical model data according to the physical pose data for the target portion of physical anatomy and the current device pose to render an AR display the 2D/3D medical model data according to the user's perspective view of the physical region of interest.

Figure 3:
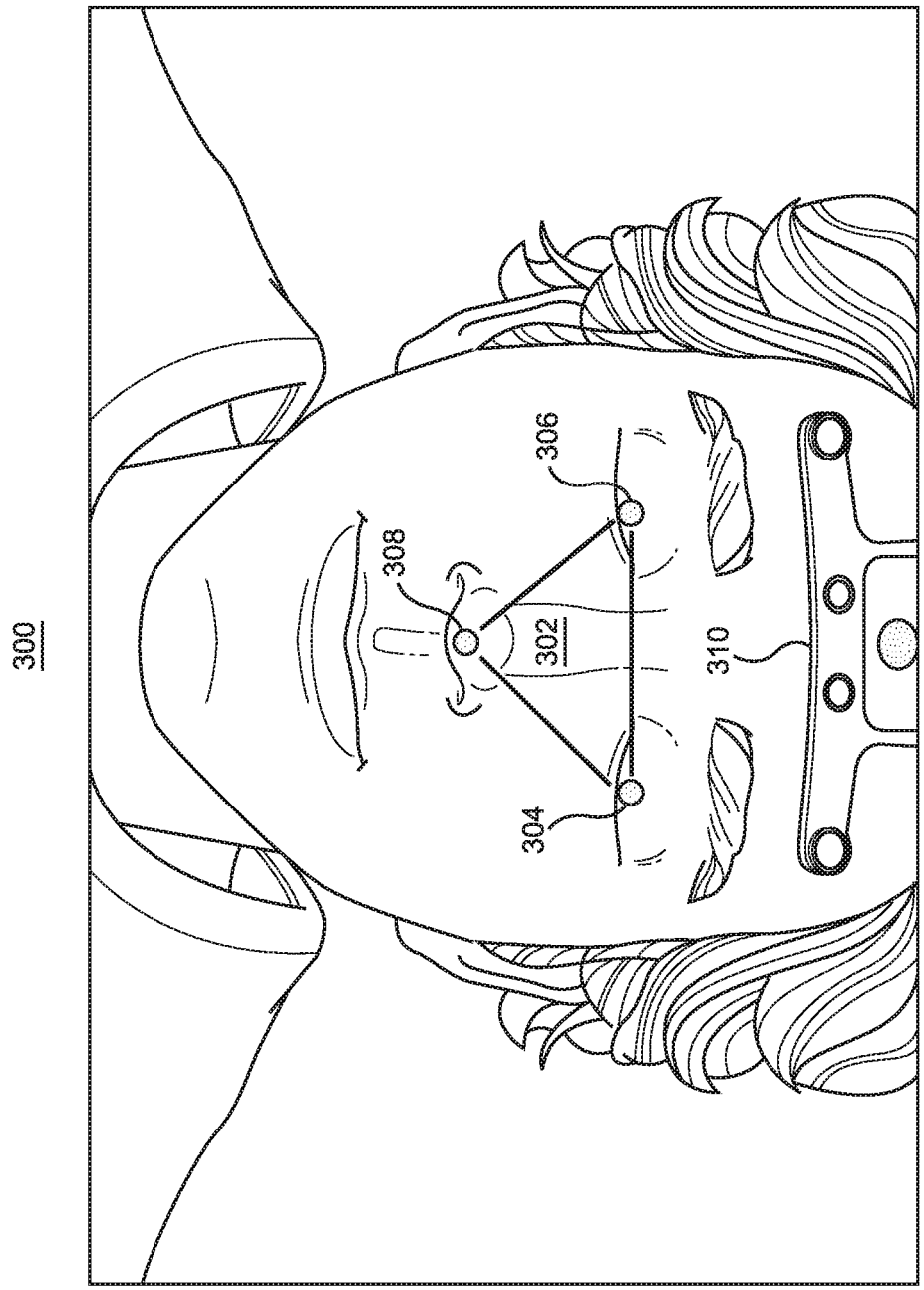
FIG. 3 is a diagram illustrating an exemplary environment in which some embodiments may operate.

As shown in FIG. 3, an output region of interest 302 may be defined by a facial landmark detection algorithm. The Registration Engine feeds a captured infrared image of a patient's facial area into a facial landmark detection algorithm. The output returned by the facial landmark detection algorithm is a region of interest 302 defined within (or at) the facial area. For example, the output region of interest 302 may be defined according to a triangular shape with vertices 304, 306, 308 defined by the facial landmark detection algorithm. For example, the first vertex 304 may be placed within a right eye area and a second vertex 306 may be placed within a left eye area. A third vertex 308 may be placed within a nose area. The output region of interest 302 identified by the facial landmark detection algorithm thereby includes the patient's anatomy located within the triangular shape defined by the first, second and third vertices 304, 306,

308. In some embodiments, upon identifying the output region of interest 302, the Registration Engine generates an Augmented Reality (AR display) 300 that includes display of a region of interest identifier. For example, the Registration Engine updates the AR display 300 to include display of a triangle that is in alignment with the physical location of the region of interest in the patient's facial area. A reference array 310 may be physically situated proximate to the physical location of the region of interest 302 at the patient's facial area.

It is understood that the various embodiments of the Registration Engine described herein are not limited to defining regions of interest according to a triangular shape. That is, the output region of interest may be defined by any kind of shape such as, for example, a square, a rectangle, any type of irregular shape, etc.

Figure 4:
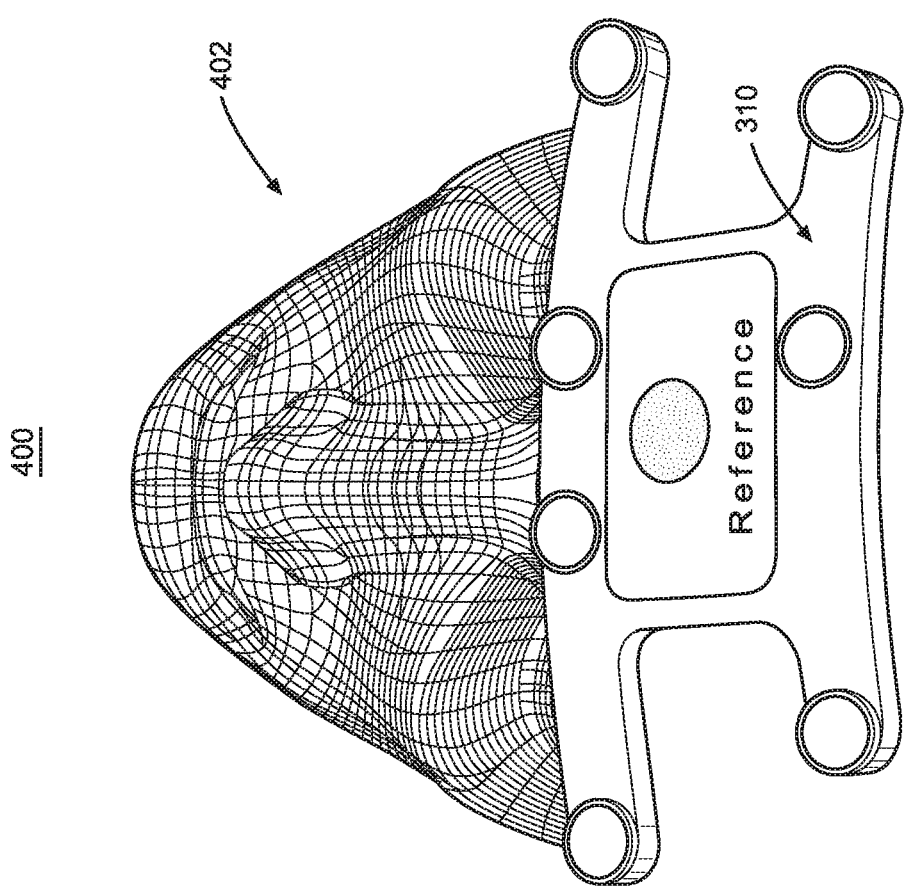
FIG. 4 is a diagram illustrating an exemplary environment in which some embodiments may operate.

As shown in FIG. 4, the Registration Engine generates a 3D point cloud 402 of the region of interest 302. The Registration Engine further accesses scan data of the target portion of physical anatomy. For example, the Registration Engine accesses MRI (magnetic resonance imaging) scan data of the patient's facial area. The Registration Engine extracts isosurface data from the scan data. For example, the Registration Engine extracts isosurface data by identifying respective portions of the scan data that correspond with surface locations of the patient's facial area.

According to one or more embodiments, the Registration Engine matches the extracted isosurface data with the 3D point cloud 402 that represents the region of interest. The Registration Engine matches the extracted isosurface data because the scan data is not defined in the coordinate space of the unified coordinate system and thereby does not reflect the current pose of the patient's facial area. The coordinates of the 3D point cloud 402, however, are defined in the coordinate space of the unified coordinate system. Further, the 3D point cloud 402 is based on a current pose of the patient's facial area.

The Registration Engine implements an Iterative Closest Point (ICP) algorithm in order to determine data in the 3D cloud point 402 that corresponds to the respective locations of the physical surface of the patient's facial area represented by the extracted isosurface data. The Registration Engine implements the ICP algorithm to identify geometric relationships between respective surface locations represented in the isosurface data. The XX further detects similar geometric relationships in the 3D point cloud 402. By detecting geometric relationships in the isosurface data that match geometric relationships in the 3D point cloud 402, the Registration Engine determines that the matching portion(s) of the isosurface data represent surface locations of the physical region of interest on the patient's facial area. By identifying the portions of the isosurface data that match the 3D point cloud 402, the Registration Engine may utilize the coordinates of the 3D cloud point 402 to transpose the isosurface data to coordinates of the current pose of the patient's facial area.

Figure 5:
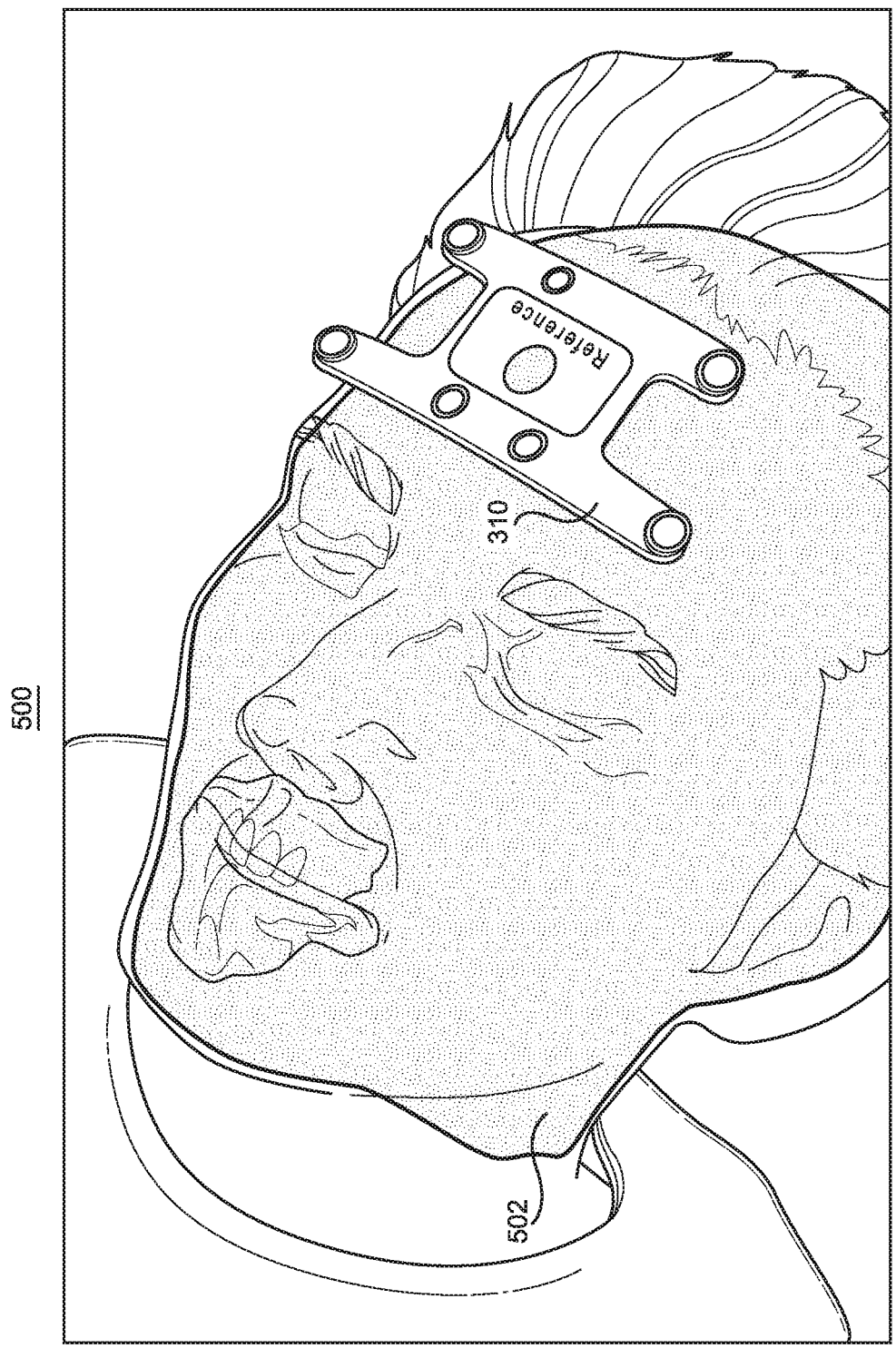
FIG. 5 is a diagram illustrating an exemplary environment in which some embodiments may operate.

As shown in FIG. 5, the Registration Engine generates an AR display 500 of a virtual overlay 502 of medical data. The Registration Engine displays the virtual overlay 502 in alignment with the current physical location of the region of interest on a patient's body. In some embodiments, the virtual overlay 502 may render medical data of the region of interest and/or medical data surrounding the region of interest.

Figure 6A:
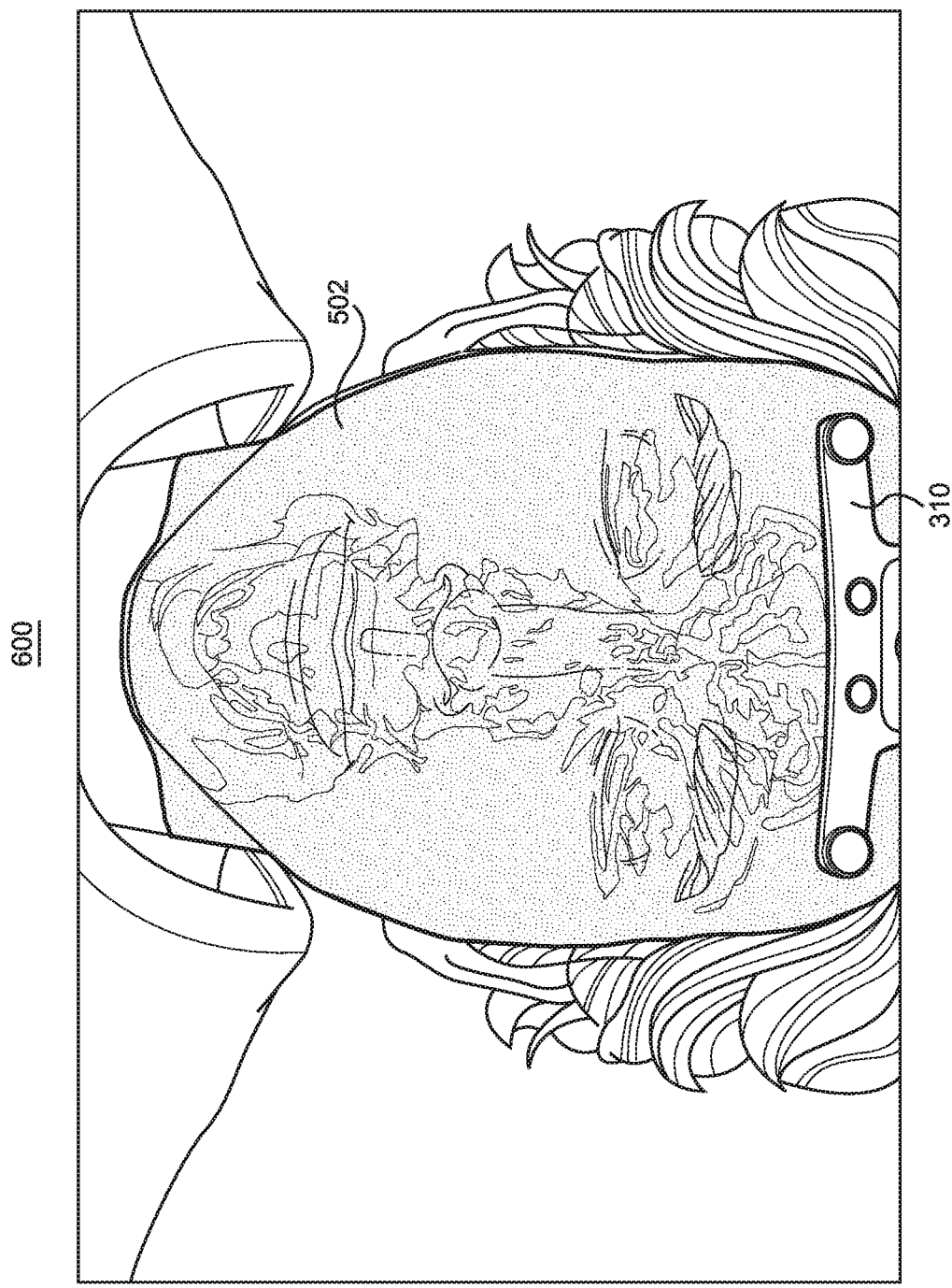
FIG. 6A is a diagram illustrating an exemplary environment in which some embodiments may operate.

As shown in FIG. 6A, the Registration Engine generates an updated AR display 600 to include the virtual overlay 502 of medical data rendered for a perspective view of a headset device worn by a user. The Registration Engine generates the updated AR display 600 based on the current physical pose of the physical region of interest at the target portion of physical anatomy and by detecting changes in a current headset device pose. For example, the Registration Engine may detect directional data associated with the current headset device pose indicating movement of the headset device (and the user) towards (i.e. closer to) the target portion of the physical anatomy. Based on the detected directional data, the Registration Engine may update the virtual overlay 502 for rendering of medical data associated with slice layers representing a greater anatomical depth than medical data previously displayed by the virtual overlay 502 before the movement of the headset was initiated.

Figure 6B:
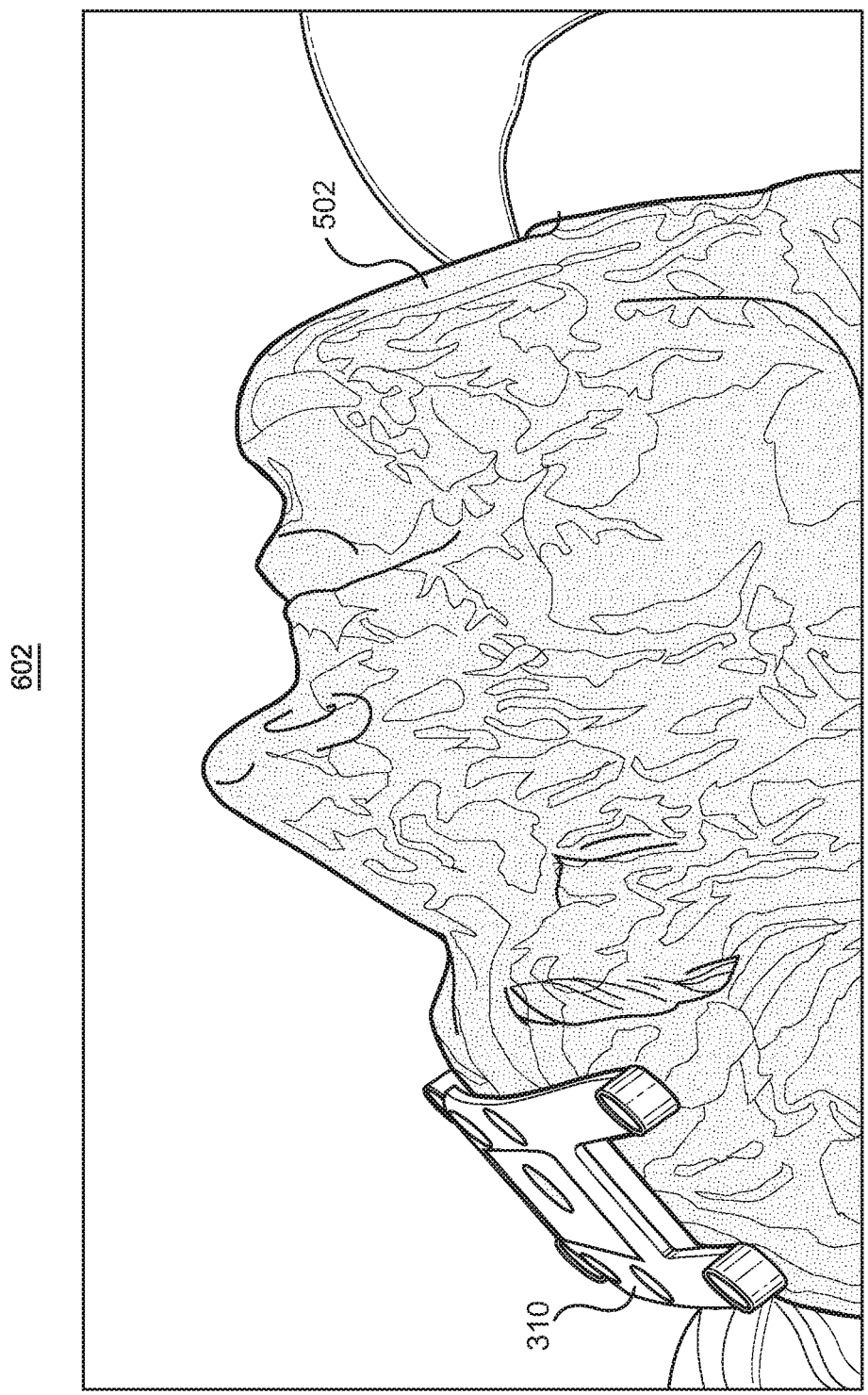
FIG. 6B is a diagram illustrating an exemplary environment in which some embodiments may operate.

As shown in FIG. 6B, the Registration Engine continually updates the virtual overlay 502 of medical data as the user's perspective view of the target portion of physical anatomy resulting from sequential changes in the current headset device pose as the user moves around the patient.

Various embodiments described herein provide functionality for selection of menu functionalities and positional display coordinates. For example, the Registration Engine tracks one or more physical gestures such as movement of a user's hand(s) and/or movement of a physical instrument(s) via one or more tracking algorithms to determine directional data to further be utilized in determining whether one or more performed physical gestures indicate a selection of one or more types of functionalities accessible via the AR display and/or selection and execution of a virtual interaction(s). For example, the Registration Engine may track movement of the user's hand that results in movement of a physical instrument and/or one or more virtual offsets and virtual objects associated with the physical instrument. The Registration Engine may determine respective positions and changing positions of one or more hand joints or one or more portions of the physical instrument. In various embodiments, the Registration Engine may implement a simultaneous localization and mapping (SLAM) algorithm.

The Registration Engine may generate directional data based at least in part on average distances between the user's palm and the user's fingers and/or hand joints or distances between portions (physical portions and/or virtual portions) of a physical instrument. In some embodiments, the Registration Engine generates directional data based on detected directional movement of the AR headset device worn by the user. The Registration Engine determines that the directional data is based on a position and orientation of the user's hand(s) (or the physical instrument) that indicates a portion(s) of a 3D virtual object with which the user seeks to select and/or virtually interact with and/or manipulate.

According to various embodiments, the Registration Engine may implement a collision algorithm to determine a portion of a virtual object the user seeks to select and/or virtually interact with. For example, the Registration Engine may track the user's hands and/or the physical instrument according to respective positional coordinates in the unified 3D coordinate system that correspond to the orientation of the user's hands and/or the physical instrument in the physical world. The Registration Engine may detect that one or more tracked positional coordinates may overlap (or be the same as) one or more positional coordinates for displaying a particular portion(s) of a virtual object. In response to detecting the overlap (or intersection), the Registration Engine determines that the user seeks to select and/or virtually interact with the portion(s) of the particular virtual object displayed at the overlapping positional coordinates.

According to various embodiments, upon determining the user seeks to select and/or virtually interact with a virtual object, the Registration Engine may detect one or more changes in hand joint positions and/or physical instrument positions and identify the occurrence of the position changes as a performed selection function. For example, a performed selection function may represent an input command to the Registration Engine confirming the user is selecting a portion of a virtual object via a ray casting algorithm and/or collision algorithm. For example, the performed selection function may also represent an input command to the Registration Engine confirming the user is selecting a particular type of virtual interaction functionality. For example, the user may perform a physical gesture of tips of two fingers touching to correspond to a virtual interaction representing an input command, such as a select input command.

The Registration Engine identifies one or more virtual interactions associated with the detected physical gestures. In various embodiments, the Registration Engine identifies a virtual interaction selected by the user, or to be performed by the user, based on selection of one or more functionalities from a 3D virtual menu displayed in the AR display. In addition, the Registration Engine identifies a virtual interaction selected by the user according to one or more pre-defined gestures that represent input commands for the Registration Engine. In some embodiments, a particular virtual interaction may be identified based on a sequence of performed physical gestures detected by the Registration Engine. In some embodiments, a particular virtual interaction may be identified as being selected by the user based on a series of preceding virtual interactions.

Figure 7:
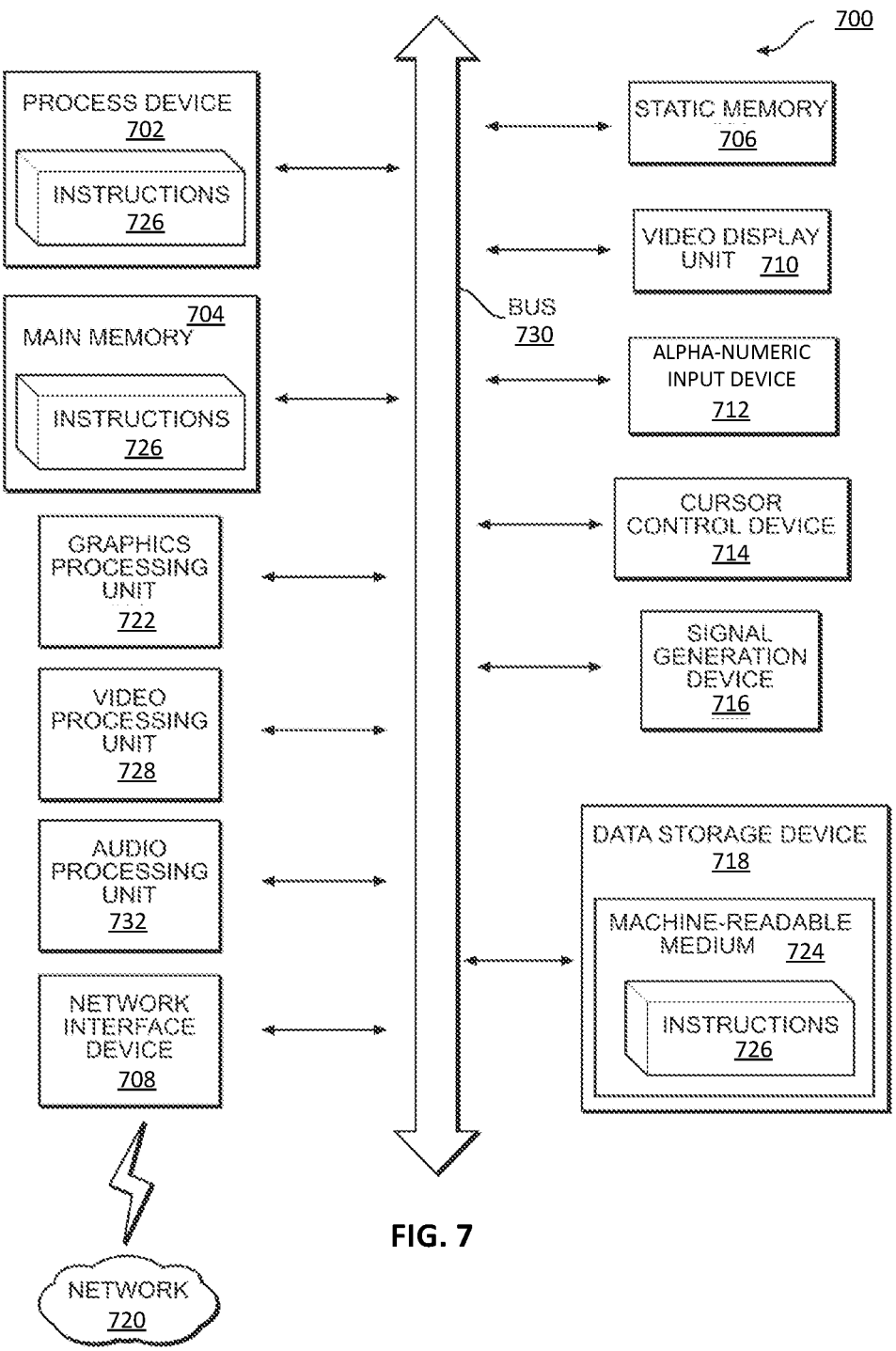
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
    identifying a region of interest from one or more infrared images portraying a target portion of a physical anatomy in a current physical pose, the physical pose comprising a current position and orientation represented by coordinates in a unified three-dimensional (3D) coordinate space;
    generating a 3D point cloud, based in part on the one or more infrared images, of the region of interest at the target portion of the physical anatomy;
    identifying region of interest isosurface data by detecting matches between one or more portions of the isosurface data and the 3D point cloud;
    determining a display location, at the target portion of the physical anatomy, for the region of interest isosurface data according to coordinates in the unified 3D coordinate space, wherein determining the display location comprises:
        determining a position and orientation of a current pose of a reference array, the current pose of the reference array comprising coordinates in the unified coordinate system, the reference array situated proximate to the target portion of the physical anatomy; and
    rendering an Augmented Reality (AR) display of medical data with respect to the display location for the region of interest isosurface data.

2. The computer-implemented method of claim 1, further comprising:
    capturing the infrared image and the depth image prior to identifying the region of interest from the infrared image, the infrared image and depth image both comprising image data collocated according to the coordinates of the unified coordinate system.

3. The computer-implemented method of claim 1, wherein identifying a region of interest comprises:
    feeding the infrared image as input to a particular anatomical landmark detection algorithm specific to the target portion of the physical anatomy; and
    wherein generating the 3D point cloud of the region of interest based in part on the infrared image comprises:
        identifying a portion of the infrared image that corresponds to respective coordinates of the region of interest; and
        identifying a portion of a depth image of the target portion of the physical anatomy that corresponds to respective coordinates of the region of interest, the infrared image and depth image both comprising at least collocated image data according to the coordinates of the unified coordinate system.

4. The computer-implemented method of claim 3, wherein the 3D point cloud represents the region of interest based on the physical pose of the target portion of the physical anatomy in accordance with the unified coordinate system.

5. The computer-implemented method of claim 1, wherein identifying region of interest isosurface data comprises:
    extracting the isosurface data from medical scan data of the target portion of the physical anatomy, the isosurface data corresponding to respective physical surface locations at the region of interest.

6. A system comprising one or more processors, and a non-transitory computer-readable medium including one or more sequences of instructions that, when executed by the one or more processors, cause the system to perform operations comprising:
    identifying a region of interest from one or more infrared images portraying a target portion of a physical anatomy in a current physical pose, the physical pose comprising a current position and orientation represented by coordinates in a unified three-dimensional (3D) coordinate space;
    generating a 3D point cloud, based in part on the one or more infrared images, of the region of interest at the target portion of the physical anatomy;

identifying region of interest isosurface data by detecting matches between one or more portions of the isosurface data and the 3D point cloud;

determining a display location, at the target portion of the physical anatomy, for the region of interest isosurface data according to coordinates in the unified 3D coordinate space, wherein determining the display location comprises:

determining a position and orientation of a current pose of a reference array, the current pose of the reference array comprising coordinates in the unified coordinate system, the reference array situated proximate to the target portion of the physical anatomy; and rendering an Augmented Reality (AR) display of medical data with respect to the display location for the region of interest isosurface data.

7. The system of claim 6, further comprising:

capturing the infrared image and the depth image prior to identifying the region of interest from the infrared image, the infrared image and depth image both comprising image data collocated according to the coordinates of the unified coordinate system.

8. The system of claim 6, wherein identifying a region of interest comprises:

feeding the infrared image as input to a particular anatomical landmark detection algorithm specific to the target portion of the physical anatomy; and wherein generating the 3D point cloud of the region of interest based in part on the infrared image comprises:

identifying a portion of the infrared image that corresponds to respective coordinates of the region of interest; and identifying a portion of a depth image of the target portion of the physical anatomy that corresponds to respective coordinates of the region of interest, the infrared image and depth image both comprising at least collocated image data according to the coordinates of the unified coordinate system.

9. The system of claim 8, wherein the 3D point cloud represents the region of interest based on the physical pose of the target portion of the physical anatomy in accordance with the unified coordinate system.

10. The system of claim 6, wherein identifying region of interest isosurface data comprises:

extracting the isosurface data from medical scan data of the target portion of the physical anatomy, the isosurface data corresponding to respective physical surface locations at the region of interest.

11. A computer program product ("product") comprising a non-transitory computer-readable medium having a computer-readable program code embodied therein to be executed by one or more processors, the program code including instructions for:

identifying a region of interest from one or more infrared images portraying a target portion of a physical anatomy in a current physical pose, the physical pose comprising a current position and orientation represented by coordinates in a unified three-dimensional (3D) coordinate space;

generating a 3D point cloud, based in part on the one or more infrared images, of the region of interest at the target portion of the physical anatomy;

identifying region of interest isosurface data by detecting matches between one or more portions of the isosurface data and the 3D point cloud;

determining a display location, at the target portion of the physical anatomy, for the region of interest isosurface data according to coordinates in the unified 3D coordinate space, wherein determining the display location comprises:

determining a position and orientation of a current pose of a reference array, the current pose of the reference array comprising coordinates in the unified coordinate system, the reference array situated proximate to the target portion of the physical anatomy; and rendering an Augmented Reality (AR) display of medical data with respect to the display location for the region of interest isosurface data.

12. The product of claim 11, wherein identifying a region of interest comprises:

feeding the infrared image as input to a particular anatomical landmark detection algorithm specific to the target portion of the physical anatomy; and wherein generating the 3D point cloud of the region of interest based in part on the infrared image comprises:

identifying a portion of the infrared image that corresponds to respective coordinates of the region of interest; and identifying a portion of a depth image of the target portion of the physical anatomy that corresponds to respective coordinates of the region of interest, the infrared image and depth image both comprising at least collocated image data according to the coordinates of the unified coordinate system.

13. The product of claim 12, wherein the 3D point cloud represents the region of interest based on the physical pose of the target portion of the physical anatomy in accordance with the unified coordinate system.

14. The product of claim 11, wherein identifying region of interest isosurface data comprises:

extracting the isosurface data from medical scan data of the target portion of the physical anatomy, the isosurface data corresponding to respective physical surface locations at the region of interest.

* * * * *